(12) United States Patent
Gotoh (10) Patent No.: US 7,359,299 B2
(45) Date of Patent: Apr. 15, 2008

(54) RECORDING MEDIUM AND READING SYSTEM

(75) Inventor: Hiroshi Gotoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 652 days.

(21) Appl. No.: 10/308,131

(22) Filed: Dec. 3, 2002

(65) Prior Publication Data

US 2003/0117921 A1   Jun. 26, 2003

(30) Foreign Application Priority Data

Dec. 6, 2001  (JP) .............................. 2001-373346
Oct. 1, 2002  (JP) .............................. 2002-289065

(51) Int. Cl.
*G11B 7/00* (2006.01)
(52) U.S. Cl. ................................................. 369/53.21
(58) Field of Classification Search ............. 369/53.21; 380/202; 705/57
See application file for complete search history.

(56) References Cited

U.S. PATENT DOCUMENTS

| | | | |
|---|---|---|---|
| 5,418,852 A | | 5/1995 | Itami et al. |
| 5,636,200 A | | 6/1997 | Taira et al. |
| 5,661,800 A | | 8/1997 | Nakashima et al. |
| 5,684,785 A | * | 11/1997 | Itami et al. ............... 369/275.2 |
| 5,740,244 A | | 4/1998 | Indeck et al. |
| 5,802,174 A | | 9/1998 | Sako et al. |
| 5,809,545 A | * | 9/1998 | Ozaki et al. ................. 711/164 |
| 6,141,730 A | * | 10/2000 | Nishiumi et al. ........... 711/115 |
| 6,304,971 B1 | | 10/2001 | Kutaragi et al. |
| 6,701,436 B1 | | 3/2004 | Hirai |
| 6,747,922 B2 | * | 6/2004 | Kamiyama ................ 369/44.28 |
| 6,894,961 B1 | * | 5/2005 | Osakabe ................... 369/47.28 |
| 7,054,245 B2 | | 5/2006 | Spruit et al. |
| 7,072,260 B1 | | 7/2006 | Sako et al. |
| 7,203,958 B2 | * | 4/2007 | Tanaka et al. ................. 726/19 |
| 2002/0120722 A1 | * | 8/2002 | Kutaragi et al. ............. 709/220 |
| 2002/0141583 A1 | * | 10/2002 | Barnard et al. .............. 380/202 |
| 2003/0009695 A1 | * | 1/2003 | Sato ............................ 713/201 |
| 2003/0107959 A1 | * | 6/2003 | Norton et al. ............ 369/30.23 |
| 2004/0133519 A1 | * | 7/2004 | Nakayama et al. ............ 705/50 |

FOREIGN PATENT DOCUMENTS

EP   0 969 463 A1   1/2000

(Continued)

OTHER PUBLICATIONS

"Disc Identification Method" CDR-Forum, 'Online!—1999 pp. 1-10, XP002274195, Retrieved from the Internet: URL:http://www.cdr-forum.de/download/cdr.pdf 'retrieved on Mar. 17, 2004!.

*Primary Examiner*—Gautam R. Patel
(74) *Attorney, Agent, or Firm*—Dickstein Shapiro LLP (57) ABSTRACT

A medium judgment program is recorded on an information recording medium. The program causes a computer to judge whether the medium is authorized. The judgment may be based on information on a unique value preformed in the medium in regard to each of the media. If the computer determines that the information recording medium is right or authorized, the program permits the computer to reproduce a main program. The main program is different than the medium judgment program. If the computer determines that the information recording medium is wrong or unauthorized, the computer is prohibited from reproducing the main program.

45 Claims, 10 Drawing Sheets

FOREIGN PATENT DOCUMENTS

| | | |
|---|---|---|
| EP | 1 083 560 A2 | 3/2001 |
| EP | 1 134 738 A2 | 9/2001 |
| EP | 1 227 481 | 7/2002 |
| JP | 4-162261 | 6/1992 |
| JP | 5-36087 | 2/1993 |
| JP | 5-225069 | 9/1993 |
| JP | 5-266575 | 10/1993 |
| JP | 7-021697 | 1/1995 |
| JP | 7-262001 | 10/1995 |
| JP | 7-334939 | 12/1995 |
| JP | 9-17119 | 1/1997 |
| JP | 9-138977 | 5/1997 |
| JP | 9-274774 | 10/1997 |
| JP | 10-105975 | 4/1998 |
| JP | 11-134719 | 5/1999 |
| JP | 11-167769 | 6/1999 |
| JP | 2000-076409 | 3/2000 |
| JP | 2000-100068 | 4/2000 |
| JP | 2000-113458 | 4/2000 |
| JP | 2000-123479 | 4/2000 |
| JP | 2001-135021 | 5/2001 |
| JP | 2001-325771 | 11/2001 |
| JP | 2001-332020 | 11/2001 |
| WO | WO 97/43853 A1 | 11/1997 |
| WO | WO 00/45381 | 8/2000 |

* cited by examiner

RECORDING MEDIUM AND READING SYSTEM

BACKGROUND OF THE INVENTION

1. Field of the Invention

This invention relates to judgment of the rightness or authorization of a medium. More specifically, this invention concerns a program, a medium, a method, and a system making use of a computer that judges whether the medium is authorized based on the program.

2. Description of the Related Art

Up to now, digital contents, such as application software, static images, and moving images, are sold or distributed widely as a shape stored in CD-ROM (Compact Disc-Read Only Memory) compatible media. With this view, a writable CD (CD-R:CD-Recordable, CD-RW:CD-ReWritable, and so forth) is utilized widely as a distribution medium of the contents. And a hybrid type CD which has a read-only area and a recordable area in one medium is being developed now as a new distribution medium of the contents. Sellers or distributors of digital contents are starting to market or distribute the hybrid type CD with digital contents stored in a read-only area of the disc, as a substitute for CD-ROM.

Methods have been proposed for preventing the contents stored in those discs from being replicated to another medium illegally. For example, the following art is disclosed in Japanese Laid-open patent application 2000-100068. A computer encodes contents based on each piece of unique information recorded in each disc the contents are stored in, and records the encoded contents on its disc. In case of reproducing the contents, the computer decodes the encoded contents with the unique information in the disc.

The following art is disclosed in Japanese Laid-open patent application 2000-123479. A computer records ID information on an optical disc drive used by an authorized user of a disc. A computer compares the ID information recorded on the disc and ID information on the optical disc drive in use before starting a program stored on the disc. If two pieces of the ID information match, the computer starts the program.

In Japanese Laid-open patent application 1999-167769, a disc and a reproduction permission medium (e.g., IC card) are put in a reproduction apparatus. The apparatus reads reproduction administrative information from the disc and reproduction permission information from the IC card. The apparatus can reproduce contents in the disc corresponding to a result of collating two pieces of the information.

A disadvantage associated with the above-described methods is that they require a unique optical disc apparatus corresponding to methods for preventing illegal or unauthorized replications in case of processing (producing etc.) information about contents or the like.

An object of the present invention is to eliminate the use of a unique optical disc apparatus from processing information stored in a disc. It is also an object of the invention to put limitations on use of a disc replicated illegally or wrongly with a general optical disc apparatus, or to make it impossible to use such an illegal, wrongful or unauthorized disc.

SUMMARY OF THE INVENTION

According to a first aspect of the invention, a program is provided for having a computer judge whether an information recording medium on which the program itself is recorded is authorized. If the computer judges that the information recording medium is authorized or right, the program permits the computer to reproduce a main program differing from the medium judgment program. If the computer, however, judges that the information recording medium is unauthorized or wrong, the program prohibits the computer from reproducing the main program.

According to another aspect of the invention, a program is used to judge whether a recordable medium is authorized (i.e., right). In a preferred embodiment of the invention, the medium judgment program is read before a main program is read by a computer. The medium judgment program and the main program may be stored in the medium. In operation, information is obtained on a unique value in regard to the medium. The information may be recorded in a wobbling groove preformed in the medium. The judging of the rightness of the medium (e.g., the determination of whether or not the medium is authorized or acceptable) can then be based on the unique value information. Reading of the main program is permitted if the medium is judged to be right, but reading of the main program is prohibited if the medium is judged to be not right.

According to another aspect of the invention, a method is performed according to the following steps. First, a computer tries to obtain information on a unique value in regard to a information recording medium (the information may be recorded in a preformed wobbling groove). Reading of a main program is prohibited if the information on the unique value is not obtained. If the unique value information is obtained, then a determination of the rightness of the information recording medium is made based on that information. Reading of the main program is permitted if the information recording medium is judged to be right. Reading of the main program if prohibited if the information recording medium is judged to be wrong.

DESCRIPTION OF PREFERRED EMBODIMENTS

Figure 1:
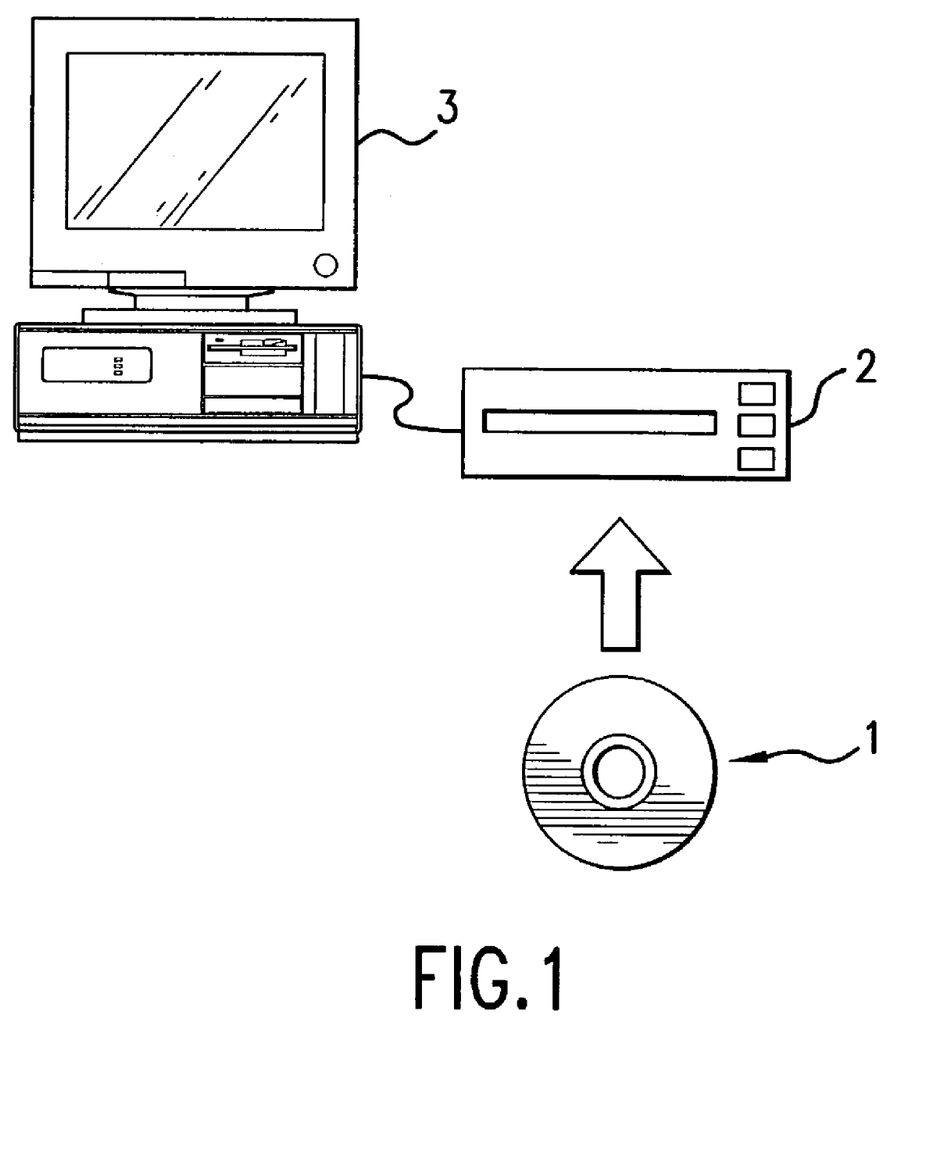
FIG. 1 shows a schematic diagram of a system for using a medium storing a medium judgment program of the present invention.

FIG. 1 shows a schematic diagram of a system for using a medium storing a medium judgment program of the present invention. In this preferred embodiment, a hybrid type CD-R (CD-Recordable) which has a read only area and a recordable area is used as an example of an information recording medium.

In FIG. 1, an application program which is stored in the hybrid type CD-R 1 is reproduced by an optical disc apparatus 2, such as a CD-R/RW drive apparatus. The optical disc apparatus receives a reproduction command from an information processing apparatus 3 as a host device, such as a personal computer (PC). The optical disc apparatus 2 records information on the disc 1 when the apparatus 2 receives a record command from the processing apparatus 3.

Figure 2:
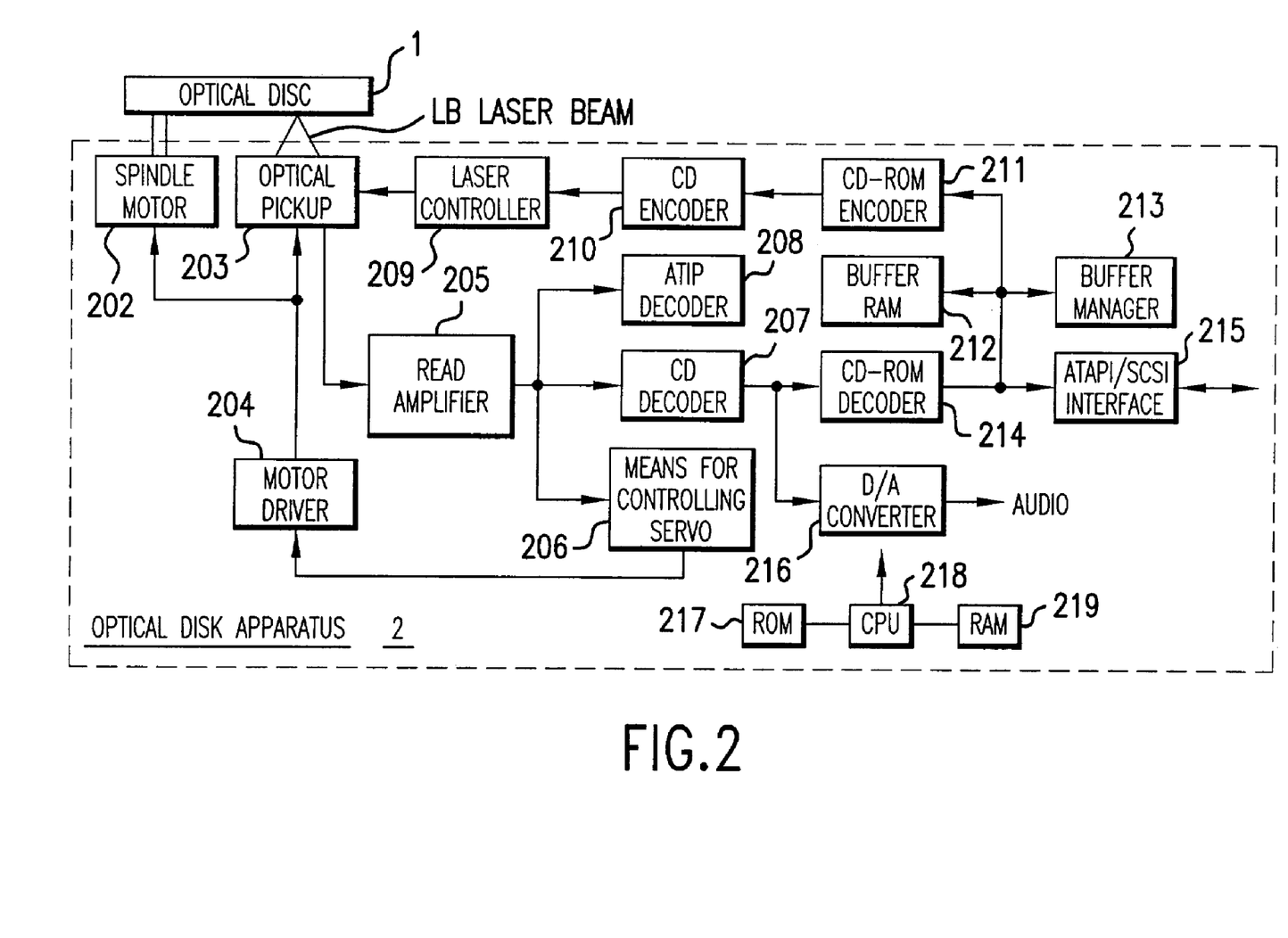
FIG. 2 shows a schematic diagram of an optical disc apparatus illustrated in FIG. 1.

FIG. 2 is a functional block diagram illustrating substantial parts of the optical disc drive apparatus in FIG. 1. In FIG. 2, 202 stands for a spindle motor, 203 for an optical pickup, 204 for a motor driver, 205 for a read amplifier, 206 for a means for controlling servo, 207 for a CD decoder, 208 for an ATIP decoder, 209 for a laser controller, 210 for a CD encoder, 211 for a CD-ROM encoder, 212 for a buffer RAM, 213 for a buffer manager, 214 for a CD-ROM decoder, 215 for an ATAPI/SCSI interface, 216 for a D/A converter, 217 for a ROM, 218 for a CPU, and 219 for a RAM. The term 'LB' stands for laser beam and 'Audio' refers to an audio output signal.

In FIG. 2, directions indicated by arrows indicate the directions in which data flow mainly. For ease of diagrammatic illustration, the CPU 218 which controls each functional block in FIG. 2 is connected only by a heavy line and the connections with each of the functional blocks are not shown. A readable control program for the CPU 218 is stored in the ROM 217. In case of turning on the power in the optical disc drive apparatus 2, the control program is loaded into a main memory in the CPU 218 from the ROM 217. The CPU 218 controls operations in each of the blocks according to the control program and saves such data as necessary for controlling the blocks in the RAM 219 temporarily.

In operation, the optical disc 1 is rotated by the spindle motor 202. The motor 202 is controlled, by the motor driver 204 and the means for controlling servo 206, such that a light spot on the disc 1 has a constant linear velocity. It is possible to change this linear velocity in phase.

The optical pickup 203 has a laser diode, an optical system, a focus actuator, a track actuator and a photodetector built-in. The optical pickup 203 emits a laser beam LB to the optical disc 1. The optical pickup 203 is moved along a sledge direction by a seek motor. The focus actuator, the track actuator and the seek motor are controlled to locate a light spot of the laser beam LB in the desired position, using the motor driver 204 and the means for controlling servo 206, based on signals obtainable from the photodetector.

To reproduce the data, reproduction signals obtained from the optical pickup 203 are input to the CD decoder 207 after amplifying and binarizing with the read amplifier 205. The input binarized data modulated in EFM (Eight to Fourteen Modulation) are demodulated in the CD decoder 207. Recorded data in the disc 1 are modulated in EFM that is summed up 8 bits at a time. It is converted 8 bits to 14 bits and then to 17 bits by adding 3 coupling bits in an EFM process. In this case, the coupling bits are added to equalize the numbers of '1' and '0' on average as a whole. This process is referred to as 'suppression of DC elements,' and suppresses slice level fluctuations in DC cut reproduction signals.

Demodulated data are de-interleaved and error-corrected. Next, the data are input to CD-ROM decoder 214 and subjected to an additional error-correction to improve data reliability. Then the data are stored in the buffer RAM 212 once by the buffer manager 213. If the stored data get into sector datum, the sector datum is transferred in one sitting to the host device 3 like FIG. 3 through the ATAPI/SCSI interface 215 in a condition as a sector datum unit. In the case of audio data, data output from CD decoder 207 are input to D/A converter 216 and are output as analog audio output signals 'Audio.'

To record data, data are transferred from the host device 3 to the optical disc drive apparatus 2 through the ATAPI/SCSI interface 215 and the data is stored in the buffer RAM 212 once by the buffer manager 213. A writing process is started in a condition of storing a certain level of data in the buffer RAM 212. Before writing data on the disc 1, it is necessary to put the laser spot in a write start position. This position is searched with a wobble signal grooved previously on the optical disc 1 as track grooves.

The wobble signal contains information on absolute time referred to as ATIP (Absolute Time In Pre-groove). The information on absolute time is obtained from the ATIP decoder 208. A synchronization signal generated by the ATIP decoder 208 is input to the CD encoder 210, and this signal makes it possible to write data into an accurate position on the optical disc 1. Error-correction codes are added to the data in the buffer RAM 212, and the data are interleaved in the CD-ROM encoder 211 and CD encoder 210, before data is written in the optical disc 1 through the laser controller 209 and the optical pickup 203.

The EFM modulated data drives the laser in 4.3218 Mbps in channel bit rates (the standard rates) as bit streams. The written data in this case makes up an EFM frame per 588 channel bits unit. A channel clock means a clock in a frequency of this channel bits.

Figure 3:
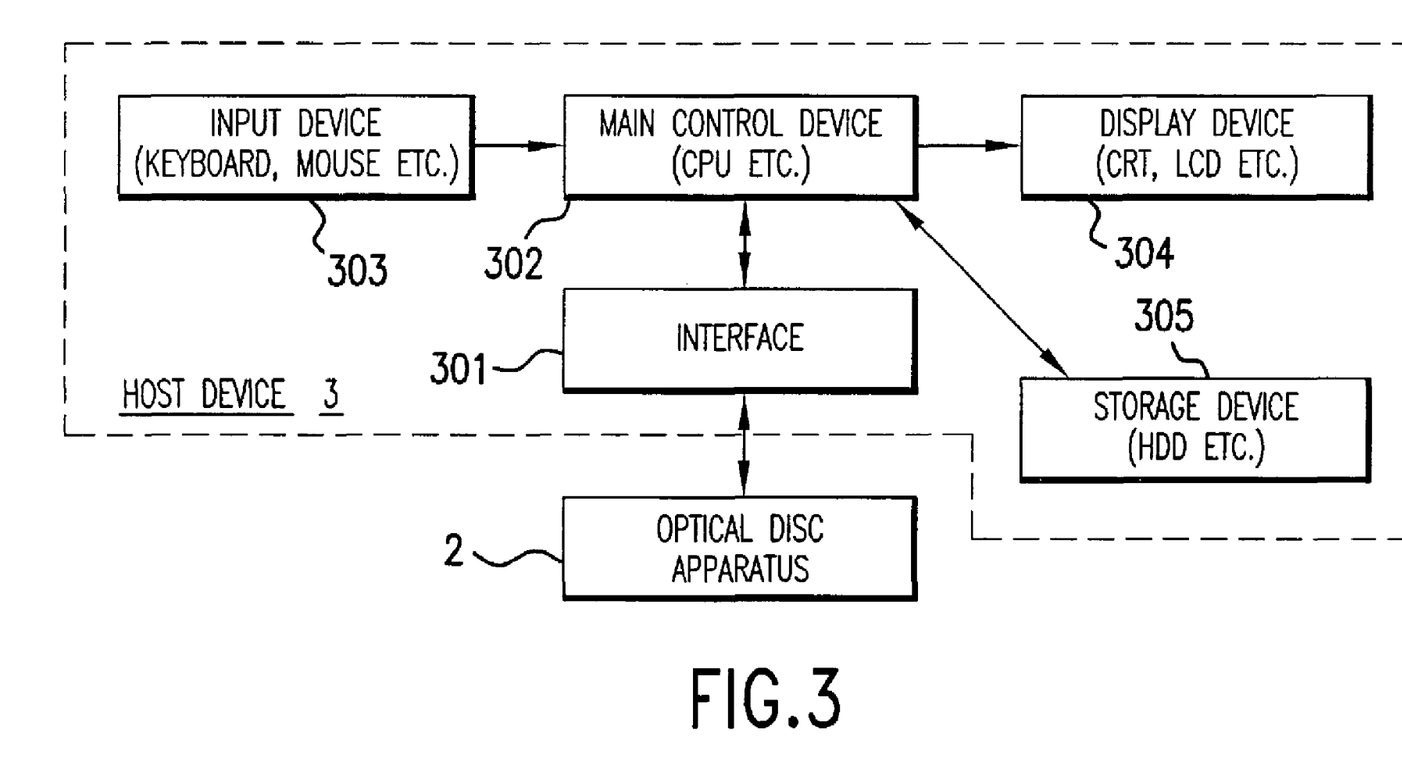
FIG. 3 shows a schematic diagram of a host device illustrated in FIG. 1.

FIG. 3 is a diagrammatic illustration of the host device 3 as information processing apparatus in FIG. 1, which is connected to the above-mentioned optical disc drive apparatus 2.

The information processing apparatus 3 comprises an interface 301, a main control device 302, an input device 303, a display device 304, and a storage device 305. The main control device 302 comprises a microcomputer and a main memory, etc. and controls the information processing apparatus 3 as a whole.

The interface 301 is a two-way transmission interface with the optical disc apparatus 2. The interface may comply with interface standards such as ATAPI, SCSI. This interface 301 is connected with the interface 215 in the optical disc drive apparatus 2 in FIG. 2. The connection between each interface may be a cable connection using a communication line such as a communication cable (e.g. SCSI cable), or it may be a wireless connection using infrared data communication, etc.

A program described as a readable code with the microcomputer in the main control device 302 is stored in the storage device 305. The storage device 305 may include a hard disk etc. In case of turning on the power in the information processing apparatus 3, this program is loaded into a main memory in the main control device 302 from the storage device 305.

The display device 304 may include a Cathode-Ray Tube (CRT), a Liquid Crystal Display (LCD) and a Plasma Display Panel (PDP), etc. The display device displays various types of information from the main control device 302.

The input device 303 may be a keyboard, a mouse, and/or a pointing device, etc. The input device notifies the main control device 302 of various types of information input by a user. These types of information from input media also may be input through a wireless system. Additionally, a CRT with a touch panel etc. may be used to unify the input device 303 and the display device 304.

The information processing apparatus 3 carries an operating system. All devices in the apparatus 3 are managed by the operating system.

Figure 4:
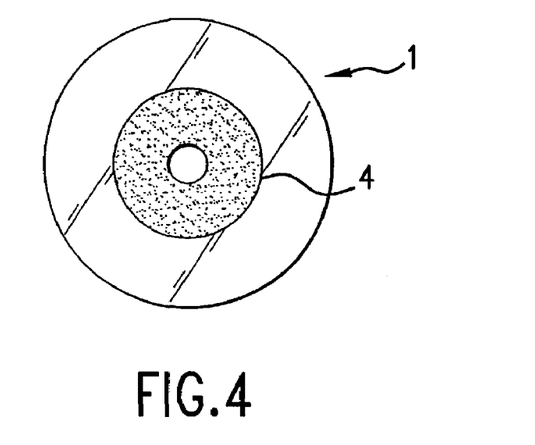
FIG. 4 shows a schematic drawing of a medium illustrated in FIG. 1.

FIG. 4 is a schematic drawing that shows the structure of the hybrid type CD-R 1 of FIGS. 1 and 2. The hybrid type CD-R 1 is a multi-session recording type that has two or more recording units (called sessions) in one disc. Pits stamped previously as a read-only area are formed in a first session. In FIG. 4, an area 4 stands for the first session. A software program that contains an application program with a function to determine illegal or unauthorized copying (a medium judgment program) and a main program is stored in the first session 4. In this embodiment, the medium judgment program and the main program are recorded in the same session such as the first session 4. Alternatively, the medium judgment and main programs may be recorded in different sessions separately.

Figure 5:
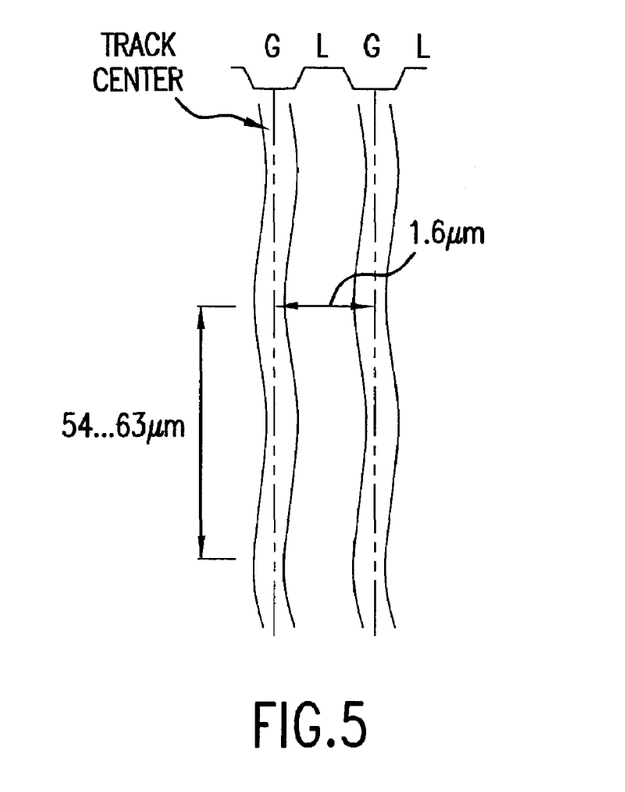
FIG. 5 shows a schematic drawing of information tracks in a CD-R medium.

FIG. 5 is a schematic drawing of information tracks in a general CD-R medium. The recording tracks are composed of land parts 'L' and groove parts 'G.' The groove parts G wobble in minute scales radially. This is referred to as wobbling and a signal detected by a Push-Pull Channel, etc. from a wobbling groove is referred to as a wobble signal. The wobbling scale is approximately ±0.03 μm as shown in FIG. 5.

When the disc is rotated at the standard speed, the wobble signal is modulated in Frequency Modulation (FM) at 22.05 KHz±1 KHz in a center frequency. The disc can be rotated in linear velocities from 1.2 m/s to 1.4 m/s as defined in the Red Book of standards on CD-R, if a rotation of the spindle motor 202 is controlled at 22.05 KHz in the center frequency.

What is superposed in FM modulation is information on absolute time on the disc. This type of information is encoded in Q channels in subcodes in a CD-ROM disc. Since it is, however, impossible to obtain this type of information in an unrecorded disc, such information is encoded in the wobble signal. This technique is referred to as ATIP.

Figure 6:
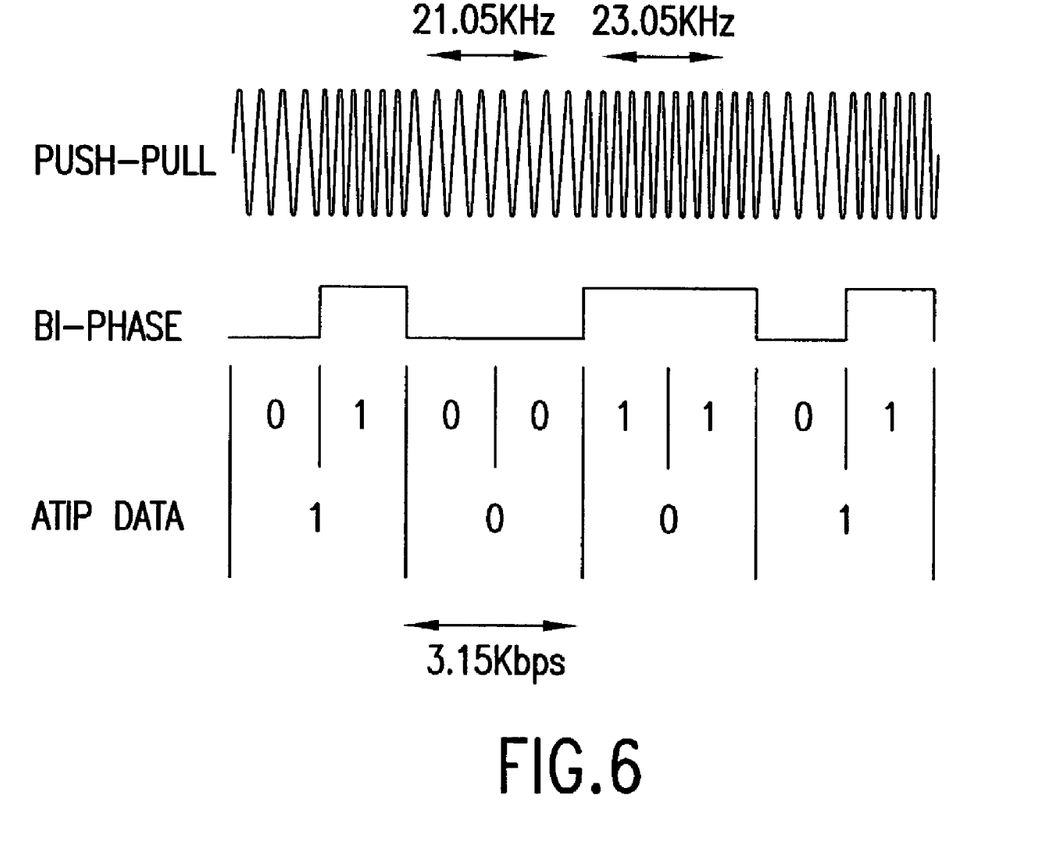
FIG. 6 shows ATIP (Absolute Time In Pre-groove) information in a medium illustrated in FIG. 1 or 4.

One ATIP sector corresponds to one data sector (2352 Byte) recorded in a main channel. Writing operations are performed as the ATIP sector is in synchronization with the data sector. Information on ATIP is not encoded in the wobble signal directly. It is modulated in FM after being modulated in Bi-Phase modulation once, as shown in FIG. 6. This is because the wobble signal is also used for disc rotation control. More specifically, 1 and 0 are counterchanged at specified cycles by the Bi-Phase modulation and average numbers of 1 and 0 are made into 1:1, such that an average frequency of the wobble signal in FM modulation is 22.05 KHz.

Information on a writing laser power setting, a start time of a lead-in area, and a last possible start time of a lead-out area etc. are encoded as Special Information encoded in ATIP in addition to information on time. In the case of the multi-session recording type, the Special Information is encoded in the lead-in area in the first session (inside of less than 50 mm in the disc radius).

The above-described wobbling groove is formed not only in writable areas of the second session or subsequent sessions but also in the read-only area of the first session. In the present embodiment, the wobbling groove is formed during the manufacturing of the disc 1, and the above-described ATIP is generated in the wobbling groove.

The Special Information in ATIP contains information on the Last Possible Start Time of Lead-out Area, which is composed of three pieces of information of Minute, Second and Frame, and a specific value is allotted to each piece.

According to information on Frame within three pieces of information, the industry group on the optical disc, the Orange Forum, allots plural characteristic values to each medium vendor. In addition, each vendor allots a characteristic value allotted by the Orange Forum to its medium.

A value of Frame in the Last Possible Start Time of Lead-out Area in ATIP in each hybrid type CD-R medium is assigned to each kind of media as a unique value. It is possible for the optical disc apparatus 2 to obtain this value by execution of 'Read ATIP' command from the host device 3. By the way it is described in the written standards on CD-R, Orange Book, in detail according to a hybrid type CD-R medium and ATIP etc.

In this embodiment, the value of Frame in the Last Possible Start Time of Lead-out Area in ATIP, hereinafter referred to as Frame value, is applied to the unique value of the disc 1. In addition, a disc having 'FF (hexadecimal)' value as the Frame value is applied to the disc 1 in this embodiment.

Figure 7:
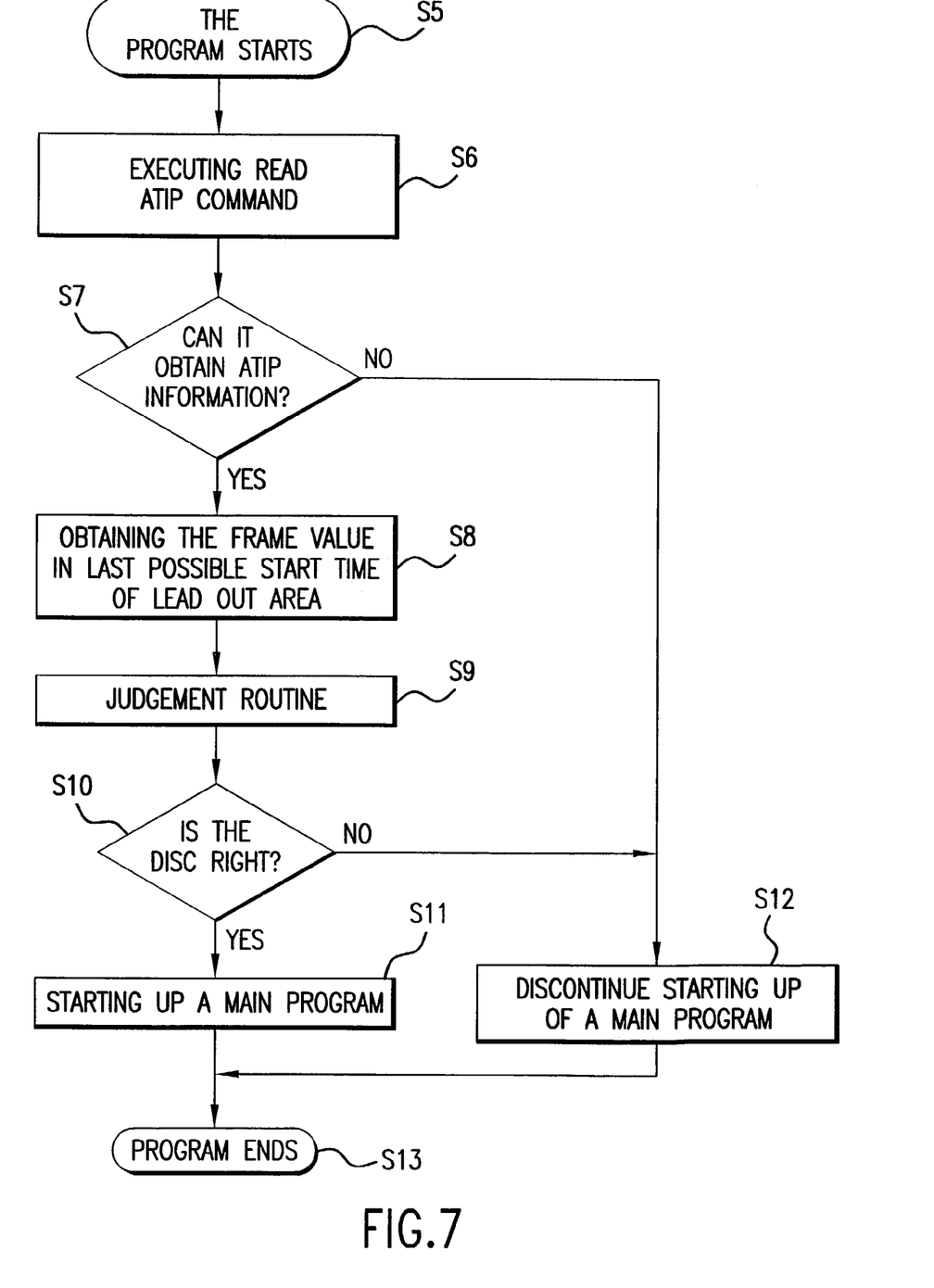
FIG. 7 is a flowchart of an operation for judging rightness of a medium of the present invention.

FIG. 7 is a flowchart showing an example of operations of the main control device 302 in the information processing apparatus 3 in FIG. 3 when reproducing the program stored in the disc 1. The operations in this flowchart relate to the disc 1 described in FIG. 4 and the system described in FIGS. 1 to 3.

When a user tries to reproduce the main program stored in the disc 1, the microcomputer in the main control device 302 reproduces the program for judging its medium before reproducing the main program (S5). The following steps are executed by the microcomputer in the main control device 302 according to the program for judging its medium. The main program and the medium judgment program may be stored separately in the disc 1 and they may be stored integrally in the disc 1. Each program may be a different program. According to another aspect of the invention, the medium judgment program may be included within the main program.

The microcomputer in the main control device 302 issues a 'Read ATIP' command to the optical disc drive apparatus 3 in accordance with the medium judgment program (S6). The optical disc drive apparatus 3 tries to obtain ATIP having the Special Information in the lead-in area in the first session based on the 'Read ATIP' command.

The microcomputer in the main control device 302 executes a process (Step S8) when it obtains the ATIP. On the other hand, the microcomputer discontinues start up of the main program (S12) when the ATIP is not obtained (S7). For example, it is supposed that a play-back only drive apparatus is used as the optical disc apparatus 2. Since a play-back only drive apparatus cannot execute an operation corresponding to the 'Read ATIP' command from the microcomputer, the microcomputer cannot receive the ATIP. Step S7 involves a prohibition of reproduction of the main program in the illustrated example. For this reason, the microcomputer in the play-back only drive apparatus is prevented from reproducing the main program in the hybrid CD-R 1 that is sold or distributed on condition of recording.

This process prevents in advance the play-back only drive apparatus from erring when the microcomputer later issues a record command to the drive apparatus.

The microcomputer in the main control device 302 obtains the Frame value in information of the ATIP in case the microcomputer could obtain its information (S8).

The microcomputer in the main control device 302 judges whether the disc in use is authorized (S9). In judgment process (S9), the microcomputer advances through the process (S11) and starts up the main program in case the disc in use is judged to be authorized or right. The microcomputer advances through the process of S12 and discontinues start up of the main program in case the disc in use is judged to be unauthorized or wrong.

Operational control by the microcomputer based on the medium judgment program is ended when the reproduction of the main program is permitted or prohibited (S13). As a result, reproduction of the main program in a disc that is duplicated illegally or wrongly is effectively prevented.

Figure 9:
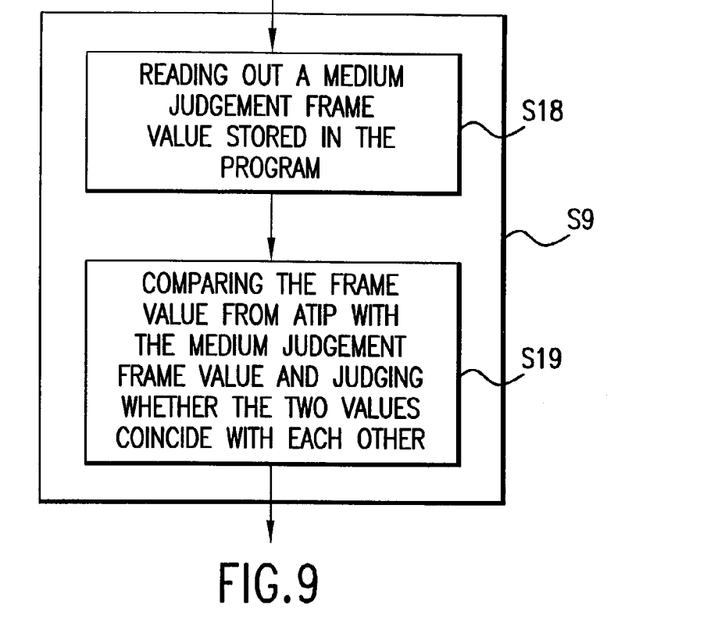
FIG. 9 is a flowchart of a method of a judgment in a judgment routine in FIG. 7 or 8.

FIG. 9 shows an example of a process of judging legality or rightness performed by the microcomputer in S9. As the microcomputer in the main control device 302 obtains the Frame value (S8), the microcomputer reads out another Frame value for judgment, hereinafter referred to as a medium judgment Frame value, stored in the medium judgment program (S18).

The microcomputer in the main control device 302 compares the Frame value obtained from the ATIP (S8) with the medium judgment Frame value read out in step S18. The microcomputer makes a determination as to whether the disc is authorized (i.e., right) when both Frame values coincide. The microcomputer determines that the disc is unauthorized (i.e., wrong) when there is a discrepancy between the Frame values (S19).

Figure 10:
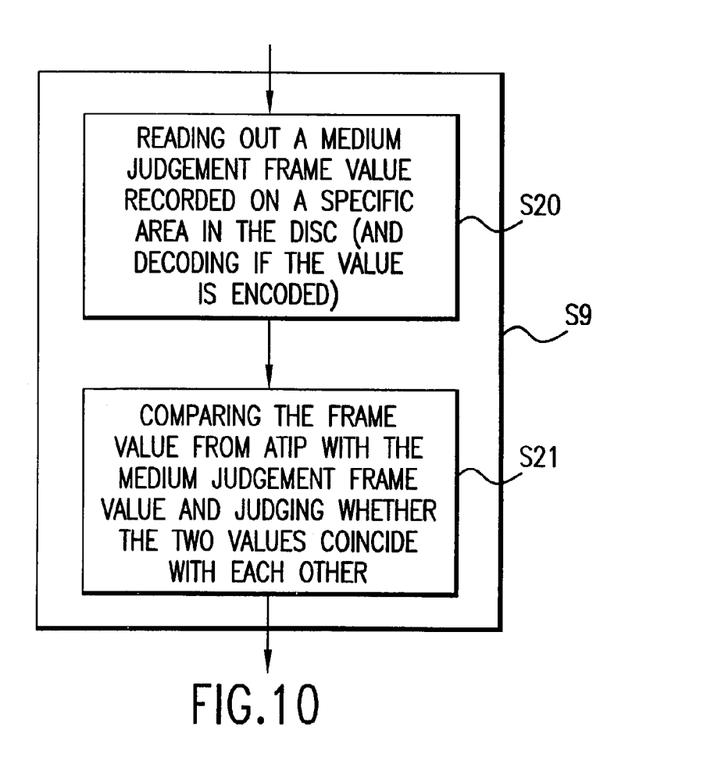
FIG. 10 is a flowchart of another method of a judgment in a judgment routine in FIG. 7 or 8.

FIG. 10 shows another example of a process of judging legality performed by the microcomputer in S9. As the microcomputer in the main control device 302 obtains the Frame value (S8), the microcomputer reads out another Frame value for judgment, hereinafter referred to as a medium judgment Frame value, recorded on a specific area in the disc 1 (S20). This specific area corresponds to an application area (offset from 883 to 1395) in Primary Volume Descriptor (PVD) in case the disc 1 is recorded in ISO9660 format for example.

In case the medium judgment Frame value 'FF' recorded on the specific area in the disc 1 is encoded, it may be possible for third parties to discover the medium judgment Frame value even if the specific area is read out with sector dumping etc. The encoding technique may be a known technique such as Data Encryption Standard (DES). The microcomputer in the main control device 302 can obtain the medium judgment Frame value by performing a process of decoding the encoded Frame value based on the medium judgment program in case of having encoded the Frame value. If desired, the medium judgment program itself can include a key to decode the code, or the microcomputer can request inputs of the key from a user.

The microcomputer in the main control device 302 compares the Frame value obtained from the ATIP (S8) with the medium judgment Frame value read out in step S20. The microcomputer judges the disc to be authorized or right when the two Frame values coincide, and judges the disc to be unauthorized or wrong when there is a discrepancy between the Frame values (S19).

A Frame value in the Last Possible Start Time of Lead-out Area in ATIP in a duplicated disc is other than 'FF' generally, if the hybrid type CD-R 1 of the present embodiment is duplicated. Since the medium judgment Frame value 'FF' does not coincide with the Frame value read out by 'Read ATIP' command on a disc that was duplicated illegally or wrongly, the microcomputer can judge that the disc was duplicated illegally or wrongly and, in consequence, can discontinue the start up of the main program. It is 'possible to duplicate but impossible to use contents.'

Figure 8:
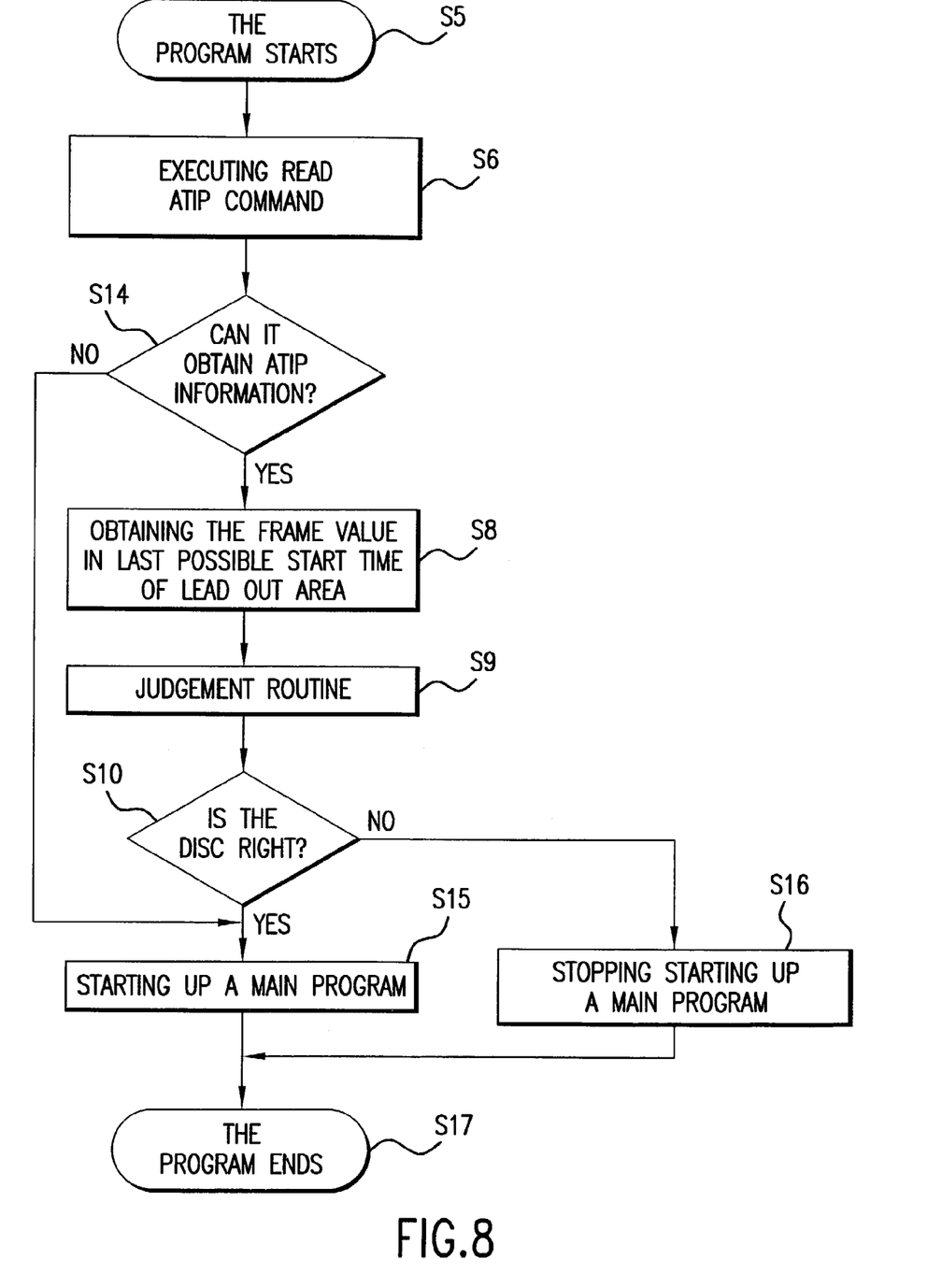
FIG. 8 is a flowchart of another operation for judging rightness of a medium of the present invention.

A second embodiment of the present invention is explained hereinafter. FIG. 8 is a flowchart showing an example of the operations of the main control device 302 in the information processing apparatus 3 of FIG. 3, with respect to reproducing the program stored in the disc 1. The operations shown in the flowchart are operations that may occur when the disc 1 (FIG. 4) is applied to the system shown in FIGS. 1 to 3.

In case a user tries to reproduce the main program stored in the disc 1, the microcomputer in the main control device 302 reproduces the program for judging the disc 1 before reproducing the main program (S5). The microcomputer is then operated according to the program for judging the medium. The main program and the medium judgment program are not only stored separately in the disc 1 but also stored integrally in the disc 1. Each program may be a different program. Alternatively, the medium judgment program may be included within the main program.

The microcomputer in the main control device 302 issues a 'Read ATIP' command to the optical disc drive apparatus 3 in accordance with the medium judgment program (S6). In response to the 'Read ATIP' command, the optical disc drive apparatus 3 tries to obtain ATIP having the Special Information in the lead-in area in the first session.

The microcomputer starts up the main program (S15) in case of not obtaining the ATIP (S14). For example, it is supposed that a play-back only drive apparatus is used as the optical disc apparatus 2. Since a play-back only drive apparatus cannot execute an operation corresponding to a 'Read ATIP' command from the microcomputer, the microcomputer cannot receive the ATIP. The microcomputer can reproduce the main program in such a case.

For this reason, the microcomputer in the main control device 302 in the play-back only drive apparatus is allowed only to reproduce (not to record) the main program in the hybrid CD-R 1 that is sold or distributed on condition of recording something therein. It is well to reproduce only a partial program in the main program in this case. As the hybrid disc 1 can be reproduced, it may be used as a so-called demonstration disc.

The microcomputer in the main control device 302 obtains the Frame value in information of the ATIP in case the microcomputer could obtain its information (S8).

The microcomputer in the main control device 302 judges whether the disc in use is authorized (S9). This process is the same as what is explained above in connection with FIGS. 9 and 10. In the judgment process (S9), when the disc in use is judged to be authorized or right, the microcomputer advances to step S15 and starts up the main program. When the disc in use is judged to be unauthorized or wrong, the microcomputer advances to step S16 and discontinues start up of the main program.

The control performed by the microcomputer based on the medium judgment program ends when the reproduction of the main program is permitted or prohibited (S17). As a result, reproduction of the main program in a disc that is duplicated illegally or wrongly is effectively prevented.

In these embodiments, the microcomputer in the main control device 302 based on the medium judgment program functions as a unique information (about Frame value in ATIP) obtaining means, a rightness judging means, a read permitting means and a read prohibiting means for the main program.

Figure 11:
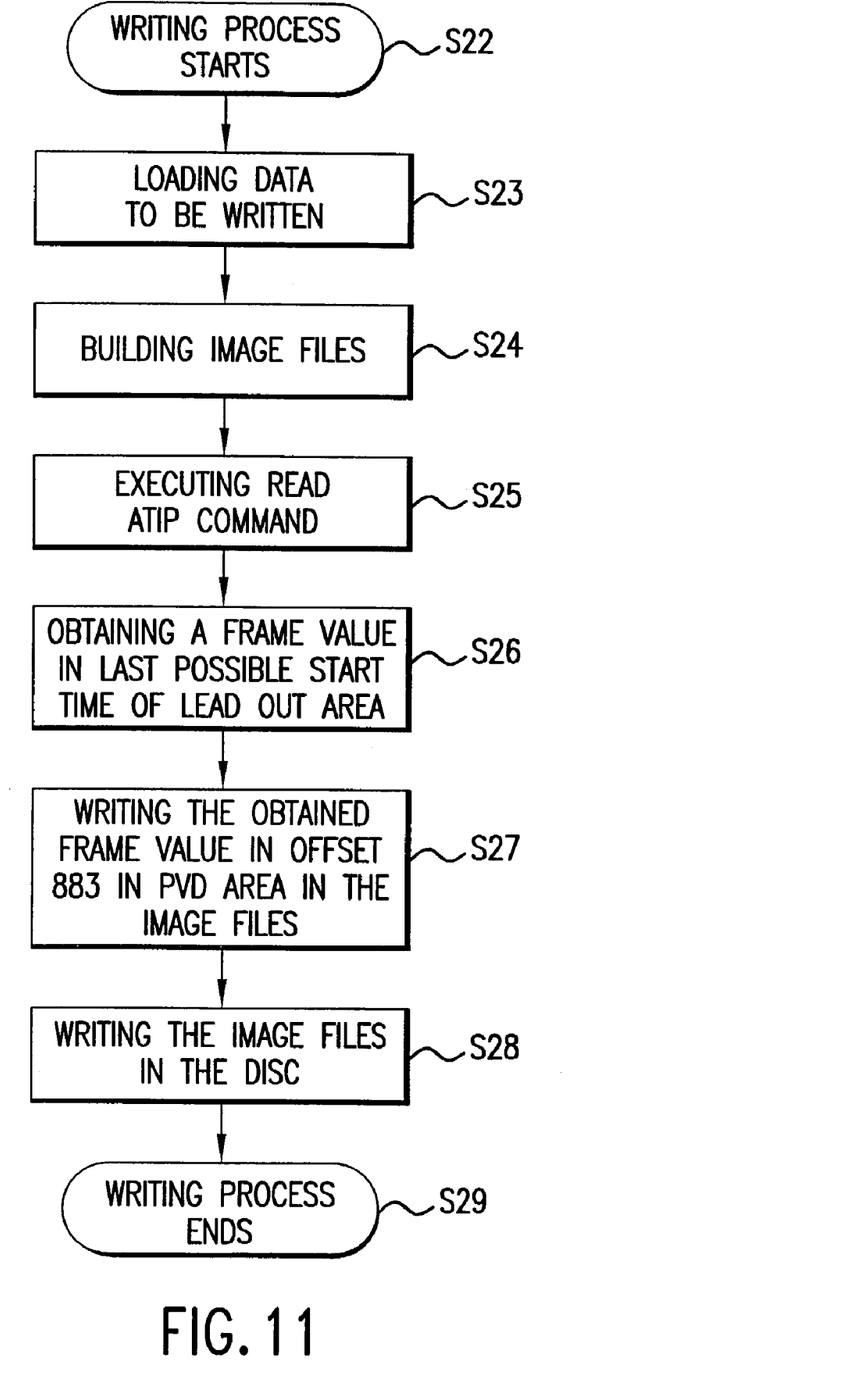
FIG. 11 is a flowchart of a process for writing a program and a frame value in an information recording medium of the present invention.
Figure 12:
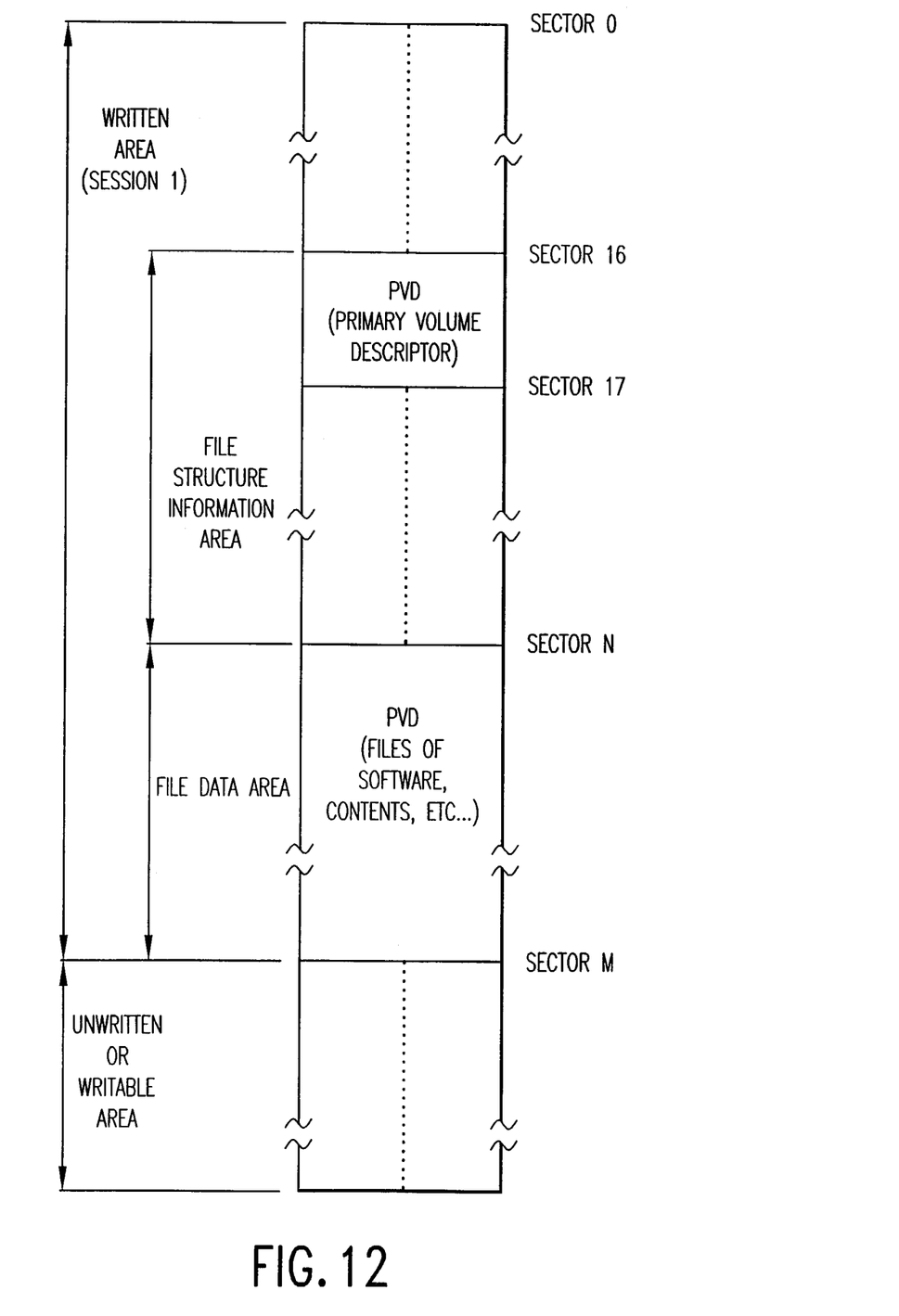
FIG. 12 is a schematic diagram of a predetermined area where a frame value is recorded according to the present invention.

In addition to the embodiment described above, a method for producing a disc for use in the present invention is described with a focus on a process for recording the medium judgment Frame value in the specific area in the disc 1. FIG. 11 is a flowchart showing a method of making a disc, focusing on processes for recording a disc characteristic information value of ATIP as a medium judgment Frame value in the specific area in the disc 1. In the illustrated method, ISO9960 is adopted as a logical format for the target disc. Please note, however, that the present invention should not be limited to the specific details of the preferred embodiments described herein. The scope of the invention should be determined by the claims.

The following explanation is based on the system described in FIGS. 1 to 3. The microcomputer in the main control device 302 starts a process of writing according to a request by a user (S22). The microcomputer loads data to be written to a memory in the main control device 302 from the storage device 305, etc. (S23).

The microcomputer in the main control device 302 loads data into an image file once, and builds this file in the storage device 305 etc. The file building step is designated in the drawings as step S24. In step S24, the data contains application programs having a function for judging illegal duplication, such as the medium judgment program and the main program.

The microcomputer in the main control device 302 issues 'Read ATIP' command after the file building step (S25). The microcomputer in the main control device 302 obtains information in ATIP in the writing target disc based on the issued 'Read ATIP' command and obtains the Frame value in the Last Possible Start Time of Lead-out Area as a Frame value obtaining step (S26).

The microcomputer in the main control device 302 writes the obtained Frame value in a specific area in the image file (S27). The specific area where information on the Frame value is filled in is such as an application area (offset from 883 to 1395) in PVD in ISO9660 format as shown in FIG. 7. According to another aspect of the invention, information on the Frame value filled in is not only the Frame value directly but information which the Frame value encodes.

Afterwards, the microcomputer in the main control device 302 writes the image file which information on the Frame value is filled in on the target disc (S28) and ends the writing process (S29).

The medium judgment program, as the application program having the function for judging illegal or right duplication, is written in the first session and information on the Frame value 'FF' is written in the specific area (the application area in PVD) in the produced disc.

A method of recording a general CD-R medium, using the system of FIGS. 1 to 3, is explained in this example for ease. The present invention, though, is not limited to this example. The above-described process may be performed in a system different from the system of FIGS. 1 to 3. The invention may also be applicable to the production of a hybrid type CD-R medium through a mastering process to produce a groove and prepits on a master disc like general CD producing process, a stamper producing process, and a replication process which contains a process of laying a recording layer on a disc, after writing information on the Frame value obtained in S27 in the PVD area in a image file.

The hybrid CD-R medium is mainly used as an explanation of recordable medium in the above-described embodiments. The present invention, though, is not limited to the hybrid CD-R medium. The invention can be applied to media having writable areas, such as CD-R/RW, DVD+RW/+R, hybrid type CD-RW, and hybrid type DVD+RW/+R.

The present invention can eliminate the need for a unique optical disc apparatus for processing information in a disc. The present invention also can put limitations on use of a disc replicated illegally or wrongly with a general optical disc apparatus, or make it impossible to use such an illegal or wrong disc.

The entire disclosures of Japanese Patent Applications Nos. 2001-373,346 and 2002-289,065, filed Dec. 6, 2001 and Oct. 1, 2002, respectively, are expressly incorporated herein by reference.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

What is claimed is:

1. A computer readable storage medium containing a computer-implemented program for judging the computer readable storage medium and for generating an acceptance or prohibition signal permitting or prohibiting reading of a main program, the computer-implemented program when executed causing a processor to:

obtain information on a unique value in regard to the medium and generate a signal corresponding to the information on the unique value, wherein the information on a unique value is recorded in a wobbling groove preformed in a read only area in the medium;

judge the rightness of the medium based on the generated signal;

permit reading of the main program if the signal is judged to be right; and prohibit reading of the main program if the signal is judged to be wrong, wherein the computer-implemented program is read before the main program is read by the processor.

2. A storage medium as defined in claim 1, wherein the information on the unique value is information on a vendor of the media, and the processor obtains the information on the unique value by reading the information on the vendor.

3. A storage medium as defined in claim 1, wherein the processor compares the information on the unique value to stored judgment information.

4. A storage medium as defined in claim 1, wherein the processor obtains judgment information recorded in a specific area other than where the information on the unique value is obtained and compares the information on the unique value with the stored judgment information.

5. A storage medium as defined in claim 4, wherein the judgment information is encoded, and the processor compares the information on the unique value with decoded information corresponding to the encoded judgment information.

6. A computer-implemented method for reading a medium judgment program stored on an information recording storage medium and generating an acceptable or prohibition signal permitting or prohibiting reading of a main program, the method comprising the steps of:

obtaining information on a unique value for the information recording storage medium, wherein the information on a unique value is recorded in a wobbling groove preformed in a read only area in the information recording storage medium, and generating a signal;
judging rightness of the information recording storage medium based on the information on the unique value;
permitting reading of the main program if the information recording storage medium is judged to be right; and
prohibiting reading of the main program if the information recording storage medium is judged to be wrong.

7. A method as defined in claim 6, wherein the information on the unique value is information on a vendor, and the step of obtaining information on the unique value includes a step of reading the information on the vendor.

8. A method as defined in claim 6, wherein the step of judging rightness of the information recording storage medium includes a step of comparing the information on the unique value to judgment information stored in the medium judgment program.

9. A method as defined in claim 6, wherein the step of judging rightness of the information recording storage medium includes steps of obtaining judgment information recorded in a specific area other than where the information on the unique value is obtained and comparing the information on the unique value with the stored judgment information.

10. A method as defined in claim 9, wherein the judgment information is encoded, and the step of judging rightness of the information recording storage medium includes a step of comparing the information on the unique value to decoded information corresponding to the encoded judgment information.

11. A system comprising:
an information recording storage medium having a recordable area and storing a medium judgment program and a main program; and
an information processing apparatus for reading the medium judgment program before reading the main program and for generating an acceptance or prohibition signal permitting or prohibiting reading of the main program, the medium judgment program causing a processor to:
obtain information on a unique value in regard to the information recording storage medium and generate the signal, wherein the information on a unique value is recorded in a wobbling groove preformed in a read only area in the medium;
judge the rightness of the information recording storage medium based on the generated signal;
permit reading of the main program if the generated signal is judged to be right; and
prohibit reading of the main program if the generated signal is judged to be wrong.

12. A system as defined in claim 11, wherein the information on the unique value is information on a vendor, and the processor obtains the information on the unique value by reading the information on the vendor.

13. A system as defined in claim 11, wherein the processor compares the information on the unique value with stored judgment information.

14. A system as defined in claim 11, wherein the processor obtains judgment information recorded in a specific area other than where the information on the unique value is obtained and compares the information on the unique value with stored judgment information.

15. A system as defined in claim 14, wherein the judgment information is encoded, and the processor compares the information on the unique value with decoded information corresponding to the encoded judgment information.

16. A storage medium storing a computer-implemented program for judging recording information stored on said storage medium and for generating an acceptance or prohibition signal permitting or prohibiting reading of a main program, wherein the program is read before the main program is read by a computer and is stored together with the main program in a read only area in the computer readable storage medium, the recording information being stored in the read only area and a recordable area, the program causing the computer to execute a method comprising the following steps:
receiving a signal;
obtaining information on a unique value in regard to the medium, based on the received signal, wherein the information on a unique value is recorded in a wobbling groove preformed in the read only area in the medium;
prohibiting reading of the main program if the received signal is not obtained by the obtaining step;
judging rightness of the medium based on the information on the unique value;
permitting reading of the main program if the medium is judged to be right by the judging step; and
prohibiting reading of the main program if the medium is judged to be wrong by the judging step.

17. A storage medium as defined in claim 16, wherein the information on the unique value is information allotted to a vendor, and the obtaining step obtains the information on the unique value by reading the information allotted to the vendor.

18. A storage medium as defined in claim 16, wherein the judging step compares the information on the unique value with stored judgment information.

19. A storage medium as defined in claim 16, wherein the judging step obtains judgment information recorded in a specific area other than where the information on the unique value is obtained and compares the information on the unique value with stored judgment information.

20. A storage medium as defined in claim 19, wherein the judgment information is encoded, and the judging step compares the information on the unique value with decoded information corresponding to the encoded judgment information.

21. A storage medium that contains a machine-readable program, said program when executed by a computer causing the computer to perform the following steps:
receiving an acceptance or prohibition signal permitting or prohibiting reading of a main program;
obtaining information on a unique value in regard to the medium from the generated signal, wherein the information on a unique value is recorded in a wobbling groove preformed in a read only area of the medium;
permitting reading of the main program if the information on the unique value is not obtained during the obtaining step;
judging rightness of the medium based on the information on the unique value;
permitting reading of the main program if the medium is judged to be right during the judging step; and
prohibiting reading of the main program if the medium is judged to be wrong during the judging step.

22. A storage medium as defined in claim 21, wherein the information on the unique value is information on a vendor, and the obtaining step obtains the information on the unique value by reading the information on the vendor.

23. A storage medium as defined in claim 21, wherein the judging step compares the information on the unique value with stored judgment information.

24. A storage medium as defined in claim 21, wherein the judging step obtains judgment information recorded in a specific area other than where the information on the unique value is obtained and compares the information on the unique value with stored judgment information.

25. A storage medium as defined in claim 24, wherein the judgment information is encoded, and the judging step compares the information on the unique value with decoded information corresponding to the encoded judgment information.

26. A computer-implemented method for reading a recording medium judgment program on an information recording medium before reading a main program on the information recording medium, the method comprising the steps of:
obtaining information on a unique value in regard to the information recording medium, wherein the information on a unique value is recorded in a wobbling groove preformed in a read only area of the information recording medium;
if the unique value is not obtained, prohibiting reading of the main program;
if the unique value is obtained, judging the rightness of the information recording medium based on the information on the unique value;
permitting reading of the main program if the information recording medium is judged to be right; and
if the information recording medium is judged to be wrong, prohibiting reading of the main program.

27. A method as defined in claim 26, wherein the information on the unique value is information on a vendor of said medium, and the step of trying to obtain information on a unique value includes a step of reading the information on the vendor.

28. A method as defined in claim 26, wherein the step of judging rightness of the information recording medium includes a step of comparing the information on the unique value to stored judgment information.

29. A method as defined in claim 26, wherein the step of judging rightness of the information recording medium includes steps of obtaining judgment information recorded in a specific area other than where the information on the unique value is obtained and comparing the information on the unique value to stored judgment information.

30. A method as defined in claim 29, wherein the judgment information is encoded, and the step of judging rightness of the information recording medium includes a step of comparing the information on the unique value with decoded information corresponding to the encoded judgment information.

31. A computer-implemented method for reading a medium judgment program and generating an acceptance or prohibition signal permitting or prohibiting reading of a main program stored on an information recording medium, the method comprising the steps of:
obtaining information on a unique value in regard to the information recording medium based on the medium judgment program, wherein the information on a unique value is recorded in a wobbling groove preformed in the read only area of the information recording medium, and generating a signal;
permitting, based on said generated signal, reading of the main program if the information on the unique value is not obtained;
judging rightness of the information recording medium based on the information on the unique value;
permitting reading of the main program if the information recording medium is judged to be right; and
prohibiting, based on said generated signal, reading of the main program if the information recording medium is judged to be wrong.

32. A method as defined in claim 31, wherein the information on the unique value is information allotted to the vendor of the medium, and the step of trying to obtain information on the unique value includes a step of obtaining the information on the unique value by reading the vendor information.

33. A method as defined in claim 31, wherein the step of judging rightness of the information recording medium includes a step of comparing the information on the unique value with judgment information stored in the medium judgment program.

34. A method as defined in claim 31, wherein the step of judging rightness of the information recording medium includes steps of obtaining judgment information recorded in an area other than where the information on the unique value is obtained and comparing the information on the unique value to stored judgment information.

35. A method as defined in claim 34, wherein the judgment information is encoded, and the step of judging rightness of the information recording medium includes a step of comparing the information on the unique value with decoded information corresponding to the encoded judgment information.

36. A system comprising:
an information recording storage medium having a read only area and a recordable area and storing a medium judgment program and a main program in the read only area; and
an information processing apparatus for reading the information recording storage medium and executing the medium judgment program before reading and executing the main program, the medium judgment program causing the apparatus to execute the following steps:
obtaining information on a unique value in regard to the information recording medium based on the medium judgment program, wherein the information on the unique value is recorded in a wobbling groove preformed in a read only area of the medium, and generating a signal;
prohibiting, based on said generated signal, reading of the main program if the information on the unique value is not obtained by the obtaining step;
judging rightness of the information recording storage medium based on the information on the unique value;
permitting, based on said generated signal, reading of the main program if the information recording storage medium is judged to be right by the judging step; and
prohibiting, based on said generated signal, reading of the main program if the information recording storage medium is judged to be wrong by the judging step.

37. A system as defined in claim 36, wherein the unique value information is related to the manufacturer of the media, and the obtaining step obtains the unique value information by reading the manufacturer information.

38. A system as defined in claim 36, wherein the judging step compares the unique value information with judgment information stored in the program.

39. A system as defined in claim 36, wherein the judging step obtains judgment information recorded in an area other than where the unique value information is obtained and compares the information on the unique value with the judgment information stored in the program.

40. A system as defined in claim 39, wherein the judgment information is encoded, and the judging step compares the unique value information with decoded information based on the encoded judgment information.

41. A system comprising:
  an information recording storage medium which contains a read only area and a recordable area and stores a medium judgment program and a main program in the read only area; and
  an information processing apparatus for reading the medium judgment program before reading the main program by a computer, the medium judgment program causing the computer to execute a method comprising the steps of:
  obtaining information on a unique value in regard to the information recording storage medium based on the medium judgment program, wherein the information on a unique value is recorded in a wobbling groove preformed in the read only area in the medium, and generating a signal;
  permitting reading of the main program if the information on the unique value is not obtained by the obtaining step;
  judging rightness of the information recording storage medium based on the information on the unique value;
  permitting, based on said generated signal, reading of the main program if the information recording storage medium is judged to be right by the judging step; and
  prohibiting, based on said generated signal, reading of the main program if the information recording storage medium is judged to be wrong by the judging step.

42. A system as defined in claim 41, wherein the information on the unique value is information allotted to a vendor, and the obtaining step obtains the information on the unique value by reading the vendor information.

43. A system as defined in claim 41, wherein the judging step compares the information on the unique value to judgment information stored in the medium judgment program.

44. A system as defined in claim 41, wherein the judging step obtains judgment information recorded in a specific area other than where the information on the unique value is obtained and compares the information on the unique value with judgment information stored in the medium judgment program.

45. A system as defined in claim 44, wherein the judgment information is encoded, and the judging step compares the information on the unique value with decoded information based on the encoded judgment information.

* * * * *